(12) United States Patent
Lucas (10) Patent No.: US 9,951,793 B2
(45) Date of Patent: Apr. 24, 2018

(54) PORTED SHROUD GEOMETRY TO REDUCE BLADE-PASS NOISE

(71) Applicant: BorgWarner Inc., Auburn Hills, MI (US)

(72) Inventor: Evan Lucas, Marshall, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/170,179

(22) Filed: Jun. 1, 2016

(65) Prior Publication Data

US 2017/0350420 A1 Dec. 7, 2017

(51) Int. Cl.
*F04D 29/66* (2006.01)
*F01D 5/02* (2006.01)
(Continued)

(52) U.S. Cl.
CPC ............. *F04D 29/665* (2013.01); *F01D 5/02* (2013.01); *F02B 33/40* (2013.01); *F02B 37/00* (2013.01);
(Continued)

(58) Field of Classification Search
CPC ...... F04D 29/665; F04D 17/10; F04D 27/009; F04D 29/053; F04D 29/284;
(Continued)

(56) References Cited

U.S. PATENT DOCUMENTS 4,990,053 A  2/1991  Rohne
7,475,539 B2  1/2009  Chen
(Continued)

FOREIGN PATENT DOCUMENTS

DE  19823274 C1  10/1999
EP  2110557 A1  10/2009
WO  2007093367 A1  8/2007

OTHER PUBLICATIONS

Hideaki Tamaki; "Effect of Recirculation Device with Counter Swirl Vane on Performance of High Pressure Ratio Centrifugal Compressor"; abstract of article; Jun. 5, 2012; American Society of Mechanical Engineers.

*Primary Examiner* — Aaron R Eastman
(74) *Attorney, Agent, or Firm* — Miller, Matthias & Hull LLP (57) ABSTRACT

A compressor housing may include a shroud portion which is axially spaced from an inlet portion and configured to at least partially surround the compressor wheel. The compressor housing may be further configured to include a recirculation cavity which is formed between an exterior surface of the shroud portion and an interior surface of the compressor housing. Furthermore, a recirculation slot may define an airflow pathway between the recirculation cavity and the compressor wheel. Additionally, the compressor housing may include an angled shroud support extending radially through the recirculation cavity from the exterior surface of the shroud portion to the interior surface of the compressor housing. The angled shroud support may be spaced an axial distance away from the recirculation slot to reduce turbulence in the airflow as the airflow moves from the recirculation cavity to the compressor wheel.

15 Claims, 6 Drawing Sheets

(51) Int. Cl.

| | |
|---|---|
| *F04D 17/10* | (2006.01) |
| *F04D 27/00* | (2006.01) |
| *F04D 29/053* | (2006.01) |
| *F04D 29/28* | (2006.01) |
| *F04D 29/42* | (2006.01) |
| *F04D 29/44* | (2006.01) |
| *F02B 33/40* | (2006.01) |
| *F02B 37/00* | (2006.01) |

(52) U.S. Cl.
CPC ........... *F04D 17/10* (2013.01); *F04D 27/009* (2013.01); *F04D 29/053* (2013.01); *F04D 29/284* (2013.01); *F04D 29/4233* (2013.01); *F04D 29/441* (2013.01); *F05D 2220/40* (2013.01); *F05D 2230/50* (2013.01)

(58) Field of Classification Search
CPC .... F04D 29/441; F04D 29/4233; F02B 33/40; F02B 37/00; F01D 5/02; F05D 2220/40; F05D 2230/50
USPC ............................................................ 415/1
See application file for complete search history.

(56) References Cited

U.S. PATENT DOCUMENTS

| | | | |
|---|---|---|---|
| 7,775,759 B2* | 8/2010 | Sirakov | F04D 29/4213 415/1 |
| 8,511,083 B2 | 8/2013 | Arnold et al. | |
| 8,882,444 B2 | 1/2014 | Williams et al. | |
| 8,690,524 B2 | 4/2014 | Yin et al. | |
| 9,091,275 B2 | 8/2015 | Chen | |
| 2007/0266705 A1* | 11/2007 | Wood | F02B 37/22 60/599 |
| 2007/0269308 A1* | 11/2007 | Wood | F02C 6/12 415/57.1 |
| 2008/0232952 A1 | 9/2008 | Gu et al. | |
| 2009/0013689 A1* | 1/2009 | Sumser | F01D 9/026 60/605.1 |
| 2009/0263234 A1* | 10/2009 | Yin | F04D 29/444 415/58.4 |
| 2014/0093354 A1* | 4/2014 | Sekularac | F04D 29/4213 415/58.4 |
| 2014/0294564 A1 | 10/2014 | Matwey et al. | |
| 2015/0037141 A1 | 2/2015 | Gerard et al. | |
| 2015/0159664 A1 | 6/2015 | Olin et al. | |
| 2015/0198163 A1 | 7/2015 | Lei et al. | |
| 2015/0377240 A1* | 12/2015 | Nasir | F02C 6/12 417/405 |
| 2016/0090901 A1* | 3/2016 | Svihla | F02B 37/02 60/605.1 |

* cited by examiner

PORTED SHROUD GEOMETRY TO REDUCE BLADE-PASS NOISE

TECHNICAL FIELD

The present disclosure relates generally a turbocharger, and more specifically to a ported shroud for a compressor housing incorporated with the turbocharger.

BACKGROUND

Turbochargers used with engines, such as internal combustion engines, generally provide compressed air to an engine intake. The compressed air may allow additional fuel to be combusted within the engine cylinders, and, therefore the engine's horsepower may be increased while keeping the engine substantially the same size. As such, incorporating turbochargers into internal combustion engines may allow for smaller engines to be used without sacrificing the engine horsepower. Furthermore, using a turbocharger may help improve fuel economy, reduce engine emissions, and increase overall engine efficiency by providing more complete combustion of the fuel injected into the engine cylinders.

In general, a turbocharger typically includes a turbine housing connected to the engine's exhaust manifold, a compressor housing connected to the engine's intake manifold and a rotatable shaft enclosed in a center bearing housing coupling the turbine and compressor housings together. The turbine housing may enclose a turbine wheel which is rotatably driven by an inflow of engine exhaust delivered through the exhaust manifold. Moreover, the turbine wheel is mounted on one end of the rotatable shaft while a compressor wheel is mounted on the opposite end of the shaft. As a result, the rotation of the turbine wheel simultaneously causes a rotation of the compressor wheel. As the compressor wheel rotates, air is drawn into the compressor through an inlet which directs the air towards the rotating compressor wheel. As the air interacts with the compressor wheel it is compressed such that there is an increase of the air mass flow rate, airflow density and/or air pressure delivered through the engine's air intake to the engine cylinders.

While rotational speed of the turbines and compressors can vary based on the size of both the turbine and compressor wheels used, in general, the turbine wheels and compressor wheels rotate at very fast rates. For example, the turbine wheel and shaft assemblies may rotate at speeds up to 300,000 RPM causing the compressor wheel to rotate at similar speed. Furthermore, during certain compressor operating conditions, such as but not limited to periods of maximum flow capacity, the interaction between the incoming air and rotating compressor wheel produces an audible noise source which may be unacceptable to vehicle passengers and other individuals in the vicinity of the operating vehicle. As a result, noise reducing strategies need to be incorporated into turbochargers to help combat the unacceptable noise levels while maintaining or increasing the operational turbocharger efficiency.

In some designs, turbochargers may incorporate multiple airflow pathways that can improve turbocharger performance across a broad range of airflow conditions. Furthermore, the airflow pathways may be formed to minimize turbulence of the airflow as it moves through the pathway. As a result, the less turbulent airflow may help increase overall turbocharger efficiency by improving the interaction between the incoming airflow and the rotating compressor wheel. Furthermore, shaping or spinning the airflow in a particular direction may help reduce the noise generated by the turbocharger. For example, spinning airflow in the opposite direction as the compressor wheel rotation may help increase the attachment time between the airflow and the compressor blade, and this increased attachment time may help reduce some of the noise which is generated by the turbocharger.

U.S. Pat. No. 7,475,539 (hereinafter the '539 patent') discloses a compressor housing incorporating an annular bypass port. The compressor housing further includes radial ribs which extend along a helical path through the annular bypass port. While such helical pathway may help in directing certain portions of the airflow they do not help minimize the turbulence or minimize noise. Therefore a turbocharger compressor housing, which includes features to minimize airflow turbulence and noise is needed.

SUMMARY OF THE DISCLOSURE

In accordance with one aspect of the disclosure, a compressor housing is disclosed. The compressor housing may be configured to enclose a compressor wheel and the compressor housing may further include an inlet portion which is configured to direct an airflow towards the compressor wheel. Moreover, the compressor housing may include a shroud portion which is axially spaced from the inlet portion and configured to at least partially surround the compressor wheel. Additionally, the compressor housing may include a volute portion which is in fluid communication with the compressor wheel, and the volute portion may define an output airflow pathway of the compressor housing. The compressor housing may be further configured to include a recirculation cavity which is formed between an exterior surface of the shroud portion and an interior surface of the compressor housing and the recirculation cavity may be in fluid communication with the inlet portion. Furthermore, a recirculation slot may define an airflow pathway between the recirculation cavity and the compressor wheel. Additionally, the compressor housing may include an angled shroud support extending radially through the recirculation cavity from the exterior surface of the shroud portion to the interior surface of the compressor housing. The angled shroud support may be spaced an axial distance away from the recirculation slot to reduce turbulence in the airflow as the airflow moves from the recirculation cavity to the compressor wheel.

In accordance with another aspect of the disclosure, a turbocharger is disclosed. The turbocharger may be configured to include a turbine wheel and a compressor wheel. Moreover, the turbocharger may further include a shaft which rotatably connects the turbine wheel and the compressor wheel. The turbocharger may further include a compressor housing enclosing the compressor wheel and an inlet portion formed in the compressor housing which may be configured to direct an airflow towards the compressor wheel. The turbocharger may further include a shroud portion which is integrated with the compressor housing and configured to circumferentially surround the compressor wheel and a volute portion in fluid communication with the compressor wheel defining an output airflow pathway of the turbocharger. The turbocharger may further include a recirculation cavity which is formed within the compressor housing and positioned between an exterior surface of the shroud portion and an interior surface of the compressor housing such that the recirculation cavity being in fluid communication with the inlet portion. Moreover a recirculation slot may define an airflow pathway between the recirculation cavity and the compressor wheel. The turbocharger may further include an angled shroud support which extends radially through the recirculation cavity from the exterior surface of the shroud portion to the interior surface of the compressor housing. Moreover, the angled shroud support may be spaced an axial distance away from the recirculation slot to minimize turbulence in the airflow as it moves from the recirculation cavity to the compressor wheel.

In accordance with a further aspect of the disclosure a method of reducing airflow turbulence and noise through a compressor is disclosed. The method may include fabricating a compressor housing which includes an inlet portion and a shroud portion. Moreover the inlet portion may be configured to direct an airflow through the shroud portion towards a compressor wheel. The method may further include forming a recirculation cavity between an exterior surface of the shroud portion and an interior surface of the compressor housing. Moreover, the shroud portion may be supported by radially extending an angled shroud support between the exterior surface of the shroud portion and the interior surface of the compressor housing. The method may further include directing a portion of the airflow form the inlet portion into an airflow pathway which flows through the recirculation cavity. Moreover the portion of airflow may be split along the angled shroud support as the portion of airflow travels through the airflow pathway. Moreover, turbulence in the portion of airflow which flows through the recirculation cavity may be reduced by spacing the angled shroud support an axial distance away from a recirculation slot such that the portion of airflow split by the angled shroud support recombines and flows the axial distance towards the recirculation slot and is delivered to the compressor wheel.

These and other aspects and features of the present disclosure will be better understood when reading the following detailed description in conjunction with the accompanying drawings.

DETAILED DESCRIPTION

Figure 1:
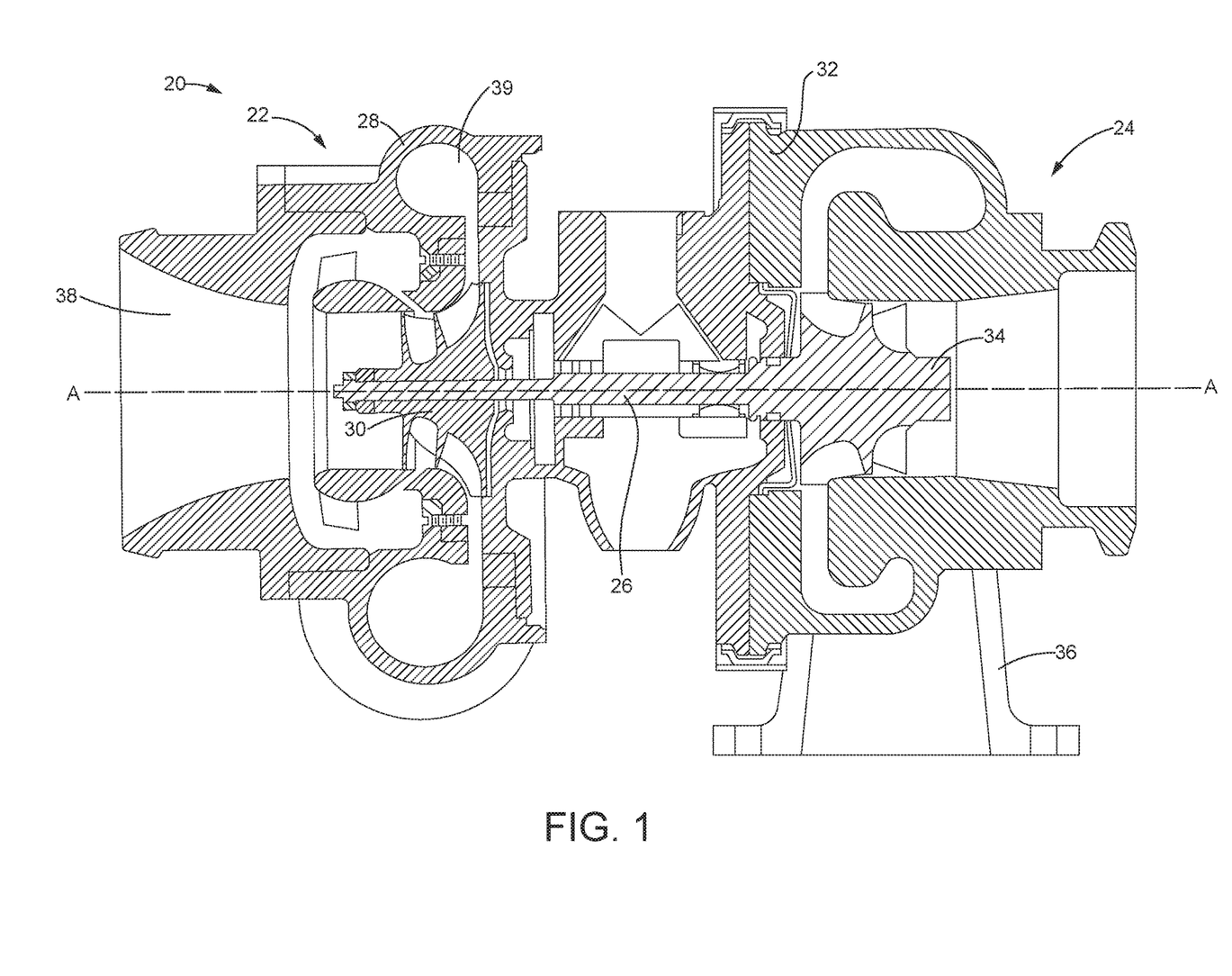
FIG. 1 is a cross-sectional view of a turbocharger viewed along axis A-A, consistent with one embodiment of the present disclosure.

Referring now to FIG. 1, an exemplary turbocharger 20 is shown. In one non-limiting example, the turbocharger 20 may include a compressor portion 22 and a turbine portion 24. In some embodiments, the compressor portion 22 and the turbine portion 24 may be rotatably connected a rotatable shaft 26. Furthermore, the compressor portion 22 may include a compressor housing 28 and a compressor wheel 30 that is disposed within the compressor housing 28. Additionally, the turbine portion 24 may include a turbine housing 32 and a turbine wheel 34 that is disposed within the turbine housing 32. Moreover, the compressor wheel 30 and the turbine wheel 34 may be disposed on opposite ends of the rotatable shaft 26. In some embodiments, the rotatable shaft 26, the compressor wheel 30, and the turbine wheel 34 are rotatable along an axis A-A of the turbocharger 20.

Furthermore, the turbine wheel 34 may be rotatably driven by an inflow of air or gas which is supplied through an exhaust gas inlet 36. Subsequently, since the turbine wheel 34 and the compressor wheel 30 are rotatably connected along the rotatable shaft 26, the rotation of the turbine wheel 34 may simultaneously cause a rotation of the compressor wheel 30. In one non-limiting example, as the compressor wheel 30 rotates within the compressor housing 28, an airflow 29 may be drawn into the compressor portion 22 through a compressor inlet 38. In some embodiments, the airflow 29 being drawn into the compressor portion 22 may be directed axially through the compressor inlet 38 towards the compressor wheel 30. Moreover, as the compressor wheel 30 continues to rotate, the air being drawn in through the compressor inlet 38 is compressed and radially directed by the rotating compressor wheel 30 into a volute portion 39. In some embodiments, the compressed air moves through the volute portion 39 and is transported to the engine cylinders through the engine's air intake system. As a result, the compressor wheel 30 rotation and compression of air may help to increase the air mass flow rate, the airflow density, and air pressure which is delivered through engine air intake, which supplies air to the engine and the engine cylinders.

Figure 2:
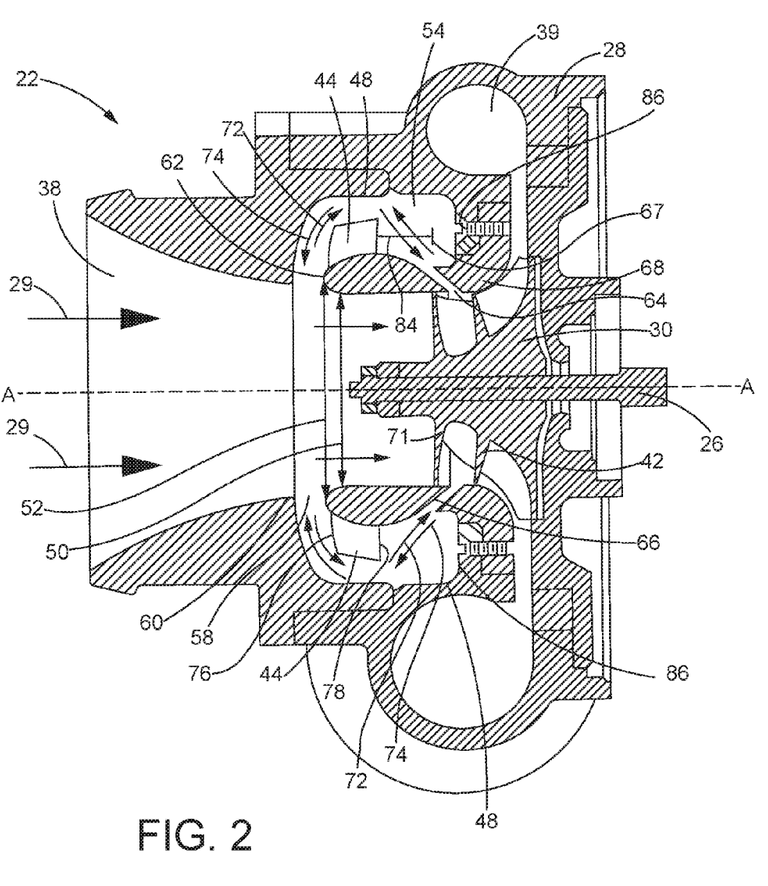
FIG. 2 is a cross-sectional view of the compressor portion of FIG. 1 viewed along axis A-A, consistent with one embodiment of the present disclosure.

Referring to FIG. 2 an embodiment of the compressor portion 22 is further illustrated in a cross-sectional view. With respect to FIG. 2, and in continued reference to FIG. 1, the compressor portion 22 is composed of the compressor housing 28, which surrounds and encloses the compressor wheel 30. In some embodiments, the outermost axial portion of the compressor housing 28 is defined by the compressor inlet 38, where ambient airflow 29, (represented by arrows), may be drawn into the compressor portion 22 by the rotating compressor wheel 30. Moreover, the airflow 29 may continue to move axially through the compressor housing 28 towards the compressor wheel 30, such that the airflow 29 may contact the compressor wheel 30 and be radially directed into the volute portion 39 of the compressor housing 28. The volute portion 39 provides an airflow pathway from the compressor portion 22 to the air intake of the combustion engine. Furthermore, in some embodiments, a shroud ring 40 may be positioned axially interior to the compressor inlet 38. Moreover, the compressor inlet 38 and the shroud ring 40 may be aligned with one another along axis A-A in order to direct the incoming air flow towards the compressor wheel 30.

The shroud ring 40 may form a ring which at least partially surrounds a portion of the compressor wheel 30, which may include a portion of the compressor wheel blades 42 that are arranged around the compressor wheel 30. Additionally, the shroud ring 40 may be configured with an inner diameter 50 and an outer diameter 52. Furthermore, the inner diameter 50 may be sized such that at least a portion of the compressor wheel 30, and at least a portion of the compressor wheel blades 42 are enclosed within the inner diameter 50, or otherwise surrounded by the shroud ring 40. Moreover, the inner diameter 50 may be sized with a tight tolerance such that the compressor wheel blades 42 are positioned in close proximity to the inner wall 48 of the shroud ring 40 while still allowing for unobstructed rotation of the compressor wheel blades 42 and the compressor wheel 30.

In some embodiments, the shroud ring 40 may have a plurality of support fins 44 which extend radially from an outer wall 46 of the shroud ring 40 to an inner wall 48 of the compressor housing 28. The plurality of support fins 44 may provide a structural attachment point between the shroud ring 40 to the compressor housing 28, such that the shroud ring 40 is securely positioned within the compressor housing 28. Moreover, the support fins 44 may be angled or otherwise arranged to provide the necessary structural support for the shroud ring 40. In one non limiting example, the shroud ring 40 has at least three support fins 44 which are arranged around the shroud ring 40 and extend in a radial fashion between the outer wall 46 of the shroud ring 40 and the inner wall 48 of the compressor housing 28. However, in some embodiments, a fewer number or greater number of support fins 44 may be arranged around the shroud ring 40. In some embodiments, the compressor housing 28 and the shroud ring 40 may be formed in a unitary structure which may provide a seamless transition between the compressor inlet 38 and the shroud ring 40. As such, the compressor housing 28 and the shroud ring 40 may be machined, stamped, molded, or otherwise fabricated out of a single piece of aluminum, steel, composite, or other known material. Alternatively, the compressor housing 28 and the shroud ring 40 may be fabricated as separate components and fixedly attached to one another, using screws, bolts, pins, or other known attachment devices, during manufacture of the turbocharger 20.

Figure 3:
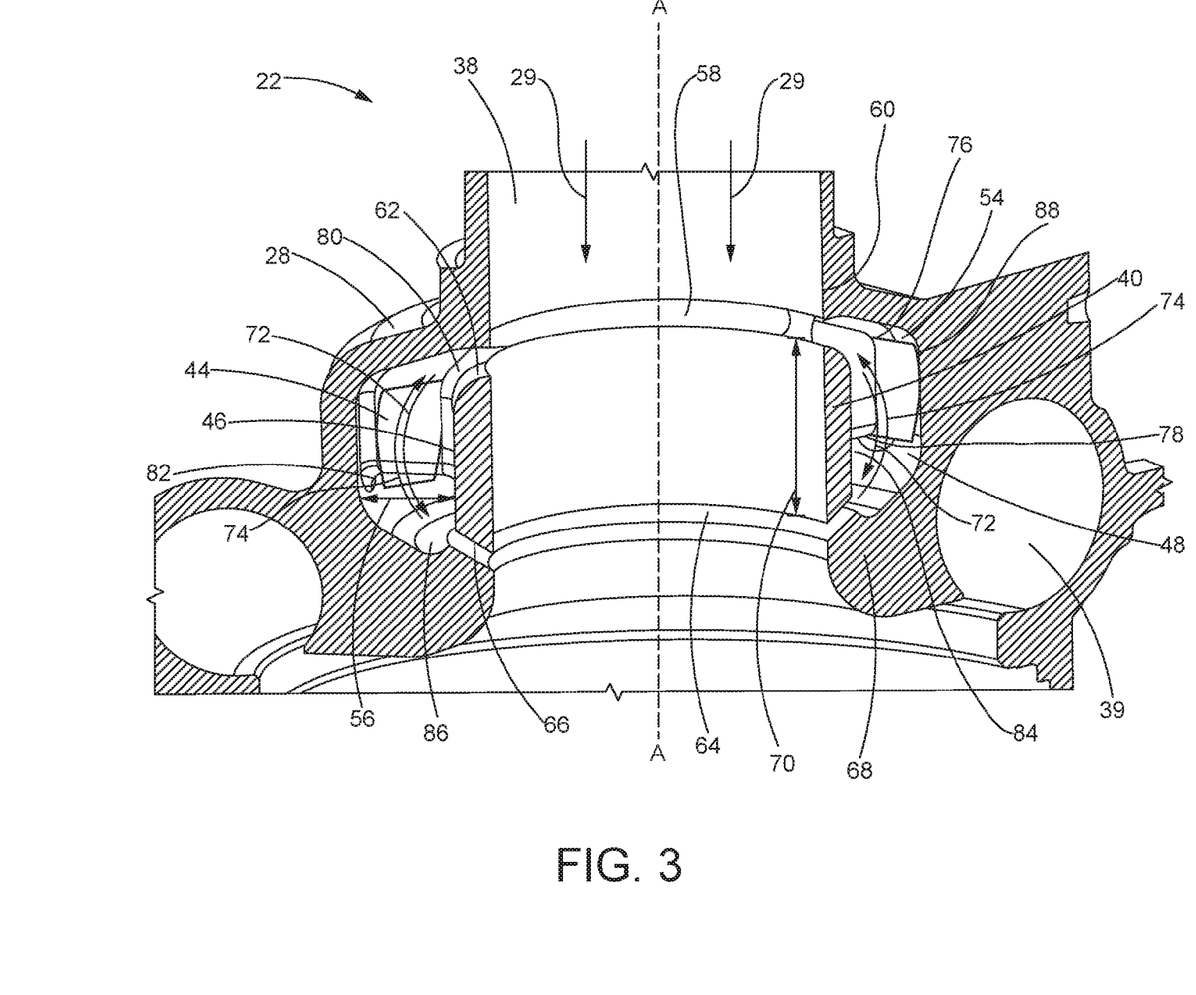
FIG. 3 is an enlarged cross-sectional view of the compressor portion, consistent with one embodiment of the present disclosure.

Referring to FIG. 3 an embodiment of the compressor portion 22 is further illustrated in a partial cross-sectional view. With respect to FIG. 3, and in continued reference to FIGS. 1 and 2, the compressor housing 28, and the shroud ring 40 may further include or otherwise define a recirculation cavity 54. In one non-limiting example, the recirculation cavity 54 may be positioned between a portion of the inner wall 48 of the compressor housing 28 and the outer wall 46 of the shroud ring 40. In one non-limiting example, the recirculation cavity 54 forms an annular cavity which radially surrounds the shroud ring 40, however other configurations of the recirculation cavity 54 are possible. In some embodiments, at least one dimension of the recirculation cavity 54, such as but not limited to the radial width may be defined by a radial space 56. In some embodiments, the radial space 56 of the recirculation cavity 54 may be measured as the distance between the outer wall 46 of the shroud ring 40 and a portion of the inner wall 48 of the compressor housing 28. Furthermore, in some embodiments the positioning of the shroud ring 40 may assist in defining a recirculation cavity inlet 58 that is formed in an axially interior position from the compressor inlet 38. In one non-limiting example, the recirculation cavity inlet 58 is defined by an annular space which is formed between the compressor inlet inner wall 60 and top surface 62 the shroud ring 40. Moreover, the recirculation cavity 54 may include a recirculation slot 64 which is at least partially defined by an annular space positioned between a bottom surface 66 the shroud ring 40 and a volute passage inner wall 68. Furthermore, the recirculation slot may be positioned proximate to the compressor wheel 30. As such, the recirculation cavity inlet 58 and the recirculation slot 64 may be sized through changing the length 70 or distance which may be measured from the top surface 62 to the bottom surface 66 of the shroud ring 40.

In one non-limiting example, the recirculation slot 64 may be formed as an angular opening by shaping the bottom surface 66 of the shroud ring 40 and a portion of the volute passage inner wall 68. As illustrated in FIG. 2, the recirculation slot 64 is positioned or otherwise formed at an axially interior position relative to the leading edge blades 71 of the compressor wheel 30. As a result, the recirculation cavity inlet 58, the recirculation cavity 54, and the recirculation slot 64 may provide a recirculation cavity bypass airflow pathway 72, (illustrated by arrows 72), for the incoming airflow 29 which flows in through the compressor inlet 38 and is drawn towards the compressor wheel 30. For example, during a period of increased or high airflow, the compressor may reach its choke point or maximum volume flow rate, such that a further increase in the flow rate is not possible. However, during a period of high airflow, a portion of the airflow 29 may be diverted from the primary airflow pathway, (i.e. through compressor inlet 38 and shroud ring 40), and directed into the recirculation cavity bypass airflow pathway 72. As such, the diverted portion of the airflow may flow through the recirculation cavity inlet 58 into the recirculation cavity 54, and exit through the recirculation slot 64 into the compressor wheel 30. As a result, the recirculation cavity bypass airflow pathway 72 may provide an alternative pathway for at least a portion of the airflow 29 during a period of high airflow.

Additionally, or alternatively, the recirculation slot 64, the recirculation cavity 54, and the recirculation cavity inlet 58 may provide a recirculation cavity surge airflow pathway 74, (illustrated by arrow 74). Is some embodiments, during reduced or low airflow conditions, the recirculation cavity surge airflow pathway 74 may provide a recirculation route for air which may be on the slower portion of the leading edge blades 71 of the compressor wheel 30. For example, during a period of reduced or low airflow, the compressor may reach its stall or surge point where the airflow volume is too small such that the airflow is unable to adhere to the suction side of the compressor wheel blades 42. As such, a portion of the incoming airflow 29 may be directed from the compressor wheel 30 into the recirculation slot 64, where it flows back through the recirculation cavity 54, and exits through the recirculation cavity inlet 58 back into the compressor inlet 38. In some cases, this will increase the airflow volume enough to keep the compressor portion 22 operating above its stall or surge point.

Figure 4:
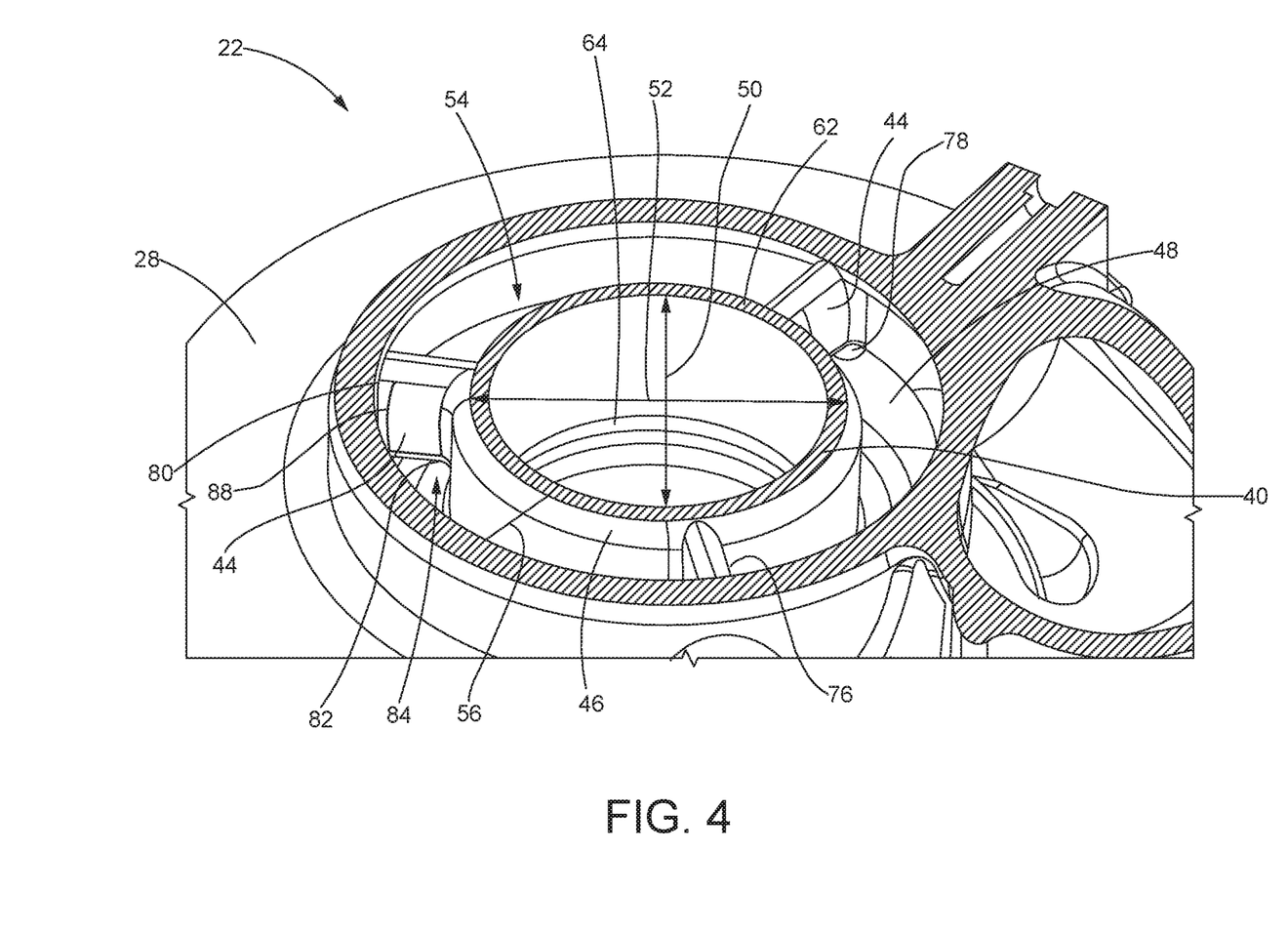
FIG. 4 is a top perspective view of the compressor portion, consistent with one embodiment of the present disclosure.

Referring to FIG. 4, with continued reference to FIGS. 2 and 3, one embodiment of the compressor portion 22 is illustrated in a perspective view. In one non-limiting example, the compressor portion 22 has a recirculation cavity 54 which is spaced radially exterior to the shroud ring 40 and positioned between the outer wall 46 of the shroud ring 40 and the inner wall 48 of the compressor housing 28. Moreover, one or more support fins 44 radially extends from the outer wall 46 of the shroud ring 40 to the inner wall 48 of the compressor housing 28. As a result, in one non-limiting example, the support fins 44, may be configured to at least partially reside within the recirculation cavity 54, and provide support for the shroud ring 40 within the compressor housing 28. Moreover, the support fins 44 may include an upper termination surface 76 which is axially spaced from a lower termination surface 78 and the support fins 44 are fixedly attached to the outer wall of the shroud ring 40 and the inner wall of the compressor housing 28 between the upper termination surface 76 and the lower termination surface 78.

Furthermore, in some embodiments, the support fins 44 may be configured to only extend partially through the recirculation cavity 54 in the axial direction. In one non-limiting example, the upper termination surface 76 may be substantially planar with the top surface 62 of the shroud ring 40. Moreover, the support fins 44 may axially extend towards the recirculation slot 64 such that the lower termination surface 78 of the support fin 44 is spaced a certain distance away from the recirculation slot 64. For example, the support fins 44 may be configured to axially extend only a certain portion, such as but not limited to three-quarters of the distance 70 (shown in FIG. 3) measured between the top surface 62 and the bottom surface 66 of the shroud ring. Moreover, in one non-limiting example, the upper termination surface 76 may be substantially planar, or otherwise aligned, with the top surface 62 of the shroud ring 40 at a support fin upper termination point 80 located at a corresponding position on the outer wall 46 of the shroud and the inner wall 48 of the compressor housing 28. Furthermore, the lower termination surface 78 may be planar, or otherwise aligned, with a support fin lower termination point 82 located at a corresponding position on the outer wall 46 of the shroud and the inner wall 48 of the compressor housing 28. Alternatively, the upper termination point 80 and lower termination point 82 of the support fin 44 may be defined at different locations between the top surface 62 and the bottom surface 66 of the shroud ring 40.

Moreover, in some embodiments, maintaining an axial distance 67 between the lower termination surface 78 of the support fins 44 and the recirculation slot 64 defines an open space 84 within the recirculation cavity 54. In one non-limiting example, the open space 84 may circumferentially surround the shroud ring 40 and axially extend between the lower termination surface 78 of the support fins 44 and a recirculation cavity inner wall 86. In some embodiments, during an increased or high airflow event, the air moving through the recirculation cavity bypass airflow pathway 72 will be split and flow along either side of the support fins 44 from the upper termination surface 76 to the lower termination surface 78. In some embodiments, when the air moving through the recirculation cavity bypass airflow pathway 72 reaches the lower termination surface 78 of the support fins 44, the air on either side of the support fins 44 may be able to reconnect within the open space 84 of the recirculation cavity 54. Moreover, the reconnected airflow may form a turbulent wake as it moves away from the lower termination surface 78 of the support fins 44. In some cases, the turbulence formed may dissipate as the recombined airflow 29 continues to move away from the lower termination surface 78 of the support fins 44. As a result, the open space 84 positioned between the lower termination surface 78 of the support fins 44 and the recirculation slot 64 may provide a distance which helps reduce the turbulence before the airflow 29 exits the recirculation cavity 54 through the recirculation slot 64 and reaches the compressor wheel 30.

Figure 5:
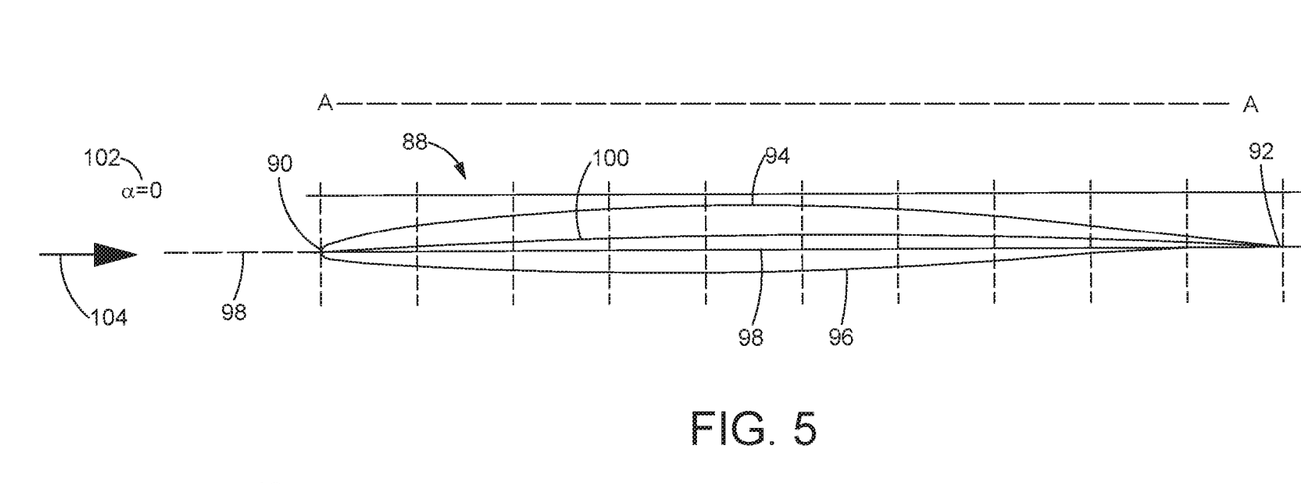
FIG. 5 is a schematic view of the airfoil profile, consistent with one embodiment of the present disclosure.

Referring to FIG. 5, and in continued reference to FIGS. 3 and 4, one exemplary profile of the support fin 44 is shown. In one embodiment, the support fins 44 may be configured with an airfoil profile 88 which is used to help shape and direct the airflow which moves through the recirculation cavity bypass airflow pathway 72. In some embodiments, the airfoil profile 88 may define a leading edge 90, a trailing edge 92, an upper surface 94 and a lower surface 96 of the support fin 44. Moreover, the airfoil profile 88 may include a chord line 98 and a camber line 100. In some embodiments, the chord line 98 may represent a straight line which extends from the leading edge 90 to the trailing edge 92 the support fin 44 with the airfoil profile 88. Moreover, the camber line 100 may describe the shape of the airfoil, and is a line which is formed by a series of points which are midway between the upper surface 94 and the lower surface 96. Typically, most airfoil profiles 88 take on either a symmetric shape or an asymmetric shape. A symmetric shape may produce an airfoil profile 88 where the chord line 98 and the camber line 100 are substantially on top of one another. Whereas, an asymmetric shape may produce an airfoil profile 88 (as shown in FIG. 5), where the chord line 98 either curves above or below the camber line 100.

Referring back to FIGS. 3 and 4, the support fins 44 may be configured with the airfoil profile 88 such that the leading edge 90 of the airfoil profile 88 represents the upper termination surface 76 of the support fins 44 and the trailing edge 92 represents the lower termination surface 78 of the support fins 44. In such a configuration, the airfoil profile 88 of the support fins 44 may be orientated such that the leading edge 90 is positioned proximate to the recirculation cavity inlet 58 and the trailing edge 92 is positioned proximate to the recirculation slot 64. Moreover, the airfoil profile 88 illustrated in FIG. 5 shows one exemplary asymmetric shaped airfoil profile 88, however, other asymmetric shapes may be used for the airfoil profile 88. Alternatively, some embodiments may incorporate a symmetric shape for the airfoil profile 88.

Figure 6:
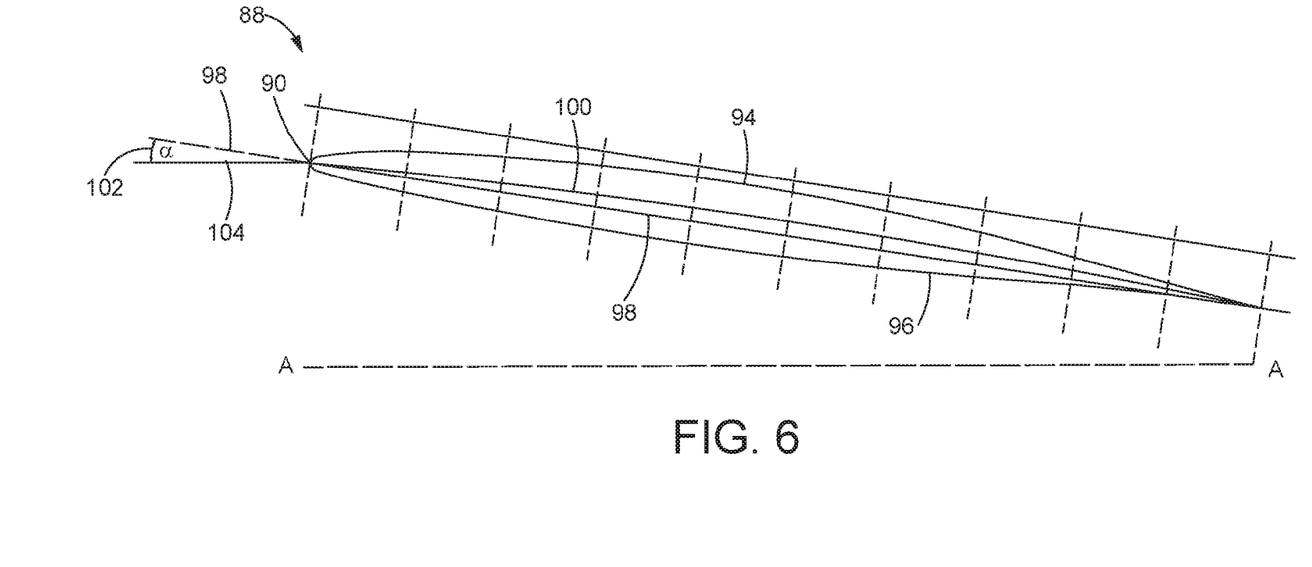
FIG. 6 is a schematic view of another exemplary airfoil profile, consistent with one embodiment of the present disclosure.

Referring back to FIGS. 3 and 4, and with continued reference to FIG. 5, the support fins 44, including the airfoil profile 88, may be positioned within the recirculation cavity 54 such that the chord line 98 is aligned to be parallel with the axis A-A of the compressor housing 28. Alternatively, FIG. 6 provides one non-limiting example where the support fins 44, including the airfoil profile 88, may be positioned within the recirculation cavity 54 such that the chord line 98 is aligned to be non-parallel with axis A-A of the compressor housing 28. Moreover, the positioning of the airfoil profile 88 may create an angle $\alpha$, which is defined as the angle of attack 102. In some embodiments, the angle of attack 102 may be formed by the intersection of the leading edge airflow 104 (i.e. direction of airflow as it contacts the leading edge of airfoil) with the chord line 98 of the airfoil profile 88. Furthermore, the angle of attack 102 may influence how airflow 29 in the recirculation cavity bypass airflow pathway 72 flows across the upper surface 94 and the lower surface 96 of the airfoil profile 88. For example, increasing the angle of attack 102 may change the amount of work done on the airflow 29 moving through recirculation cavity bypass airflow pathway 72 by the airfoil profile 88. As such, the airfoil profile 88 of FIG. 5 has an angle of attack 102 which may be close to zero, however, using an asymmetric airfoil shape may still allow the support fins 44 with the airfoil profile 88 to do some work on the recirculation cavity bypass airflow pathway 72 as it interacts with the airfoil profile 88.

Furthermore, in some embodiments the airfoil profile 88 may be configured such that the work performed on the airflow 29 in the recirculation cavity bypass airflow pathway 72 provides a swirl, a pre-swirl, or other such shaping of the recirculation cavity bypass airflow pathway 72. In some embodiments, adding swirl may cause airflow in the recirculation cavity bypass airflow pathway 72 to rotate in the same direction as the rotation of the compressor wheel 30 (shown in FIG. 2). Alternatively, adding pre-swirl may cause the airflow 29 in the recirculation cavity bypass airflow pathway 72 to rotate in the opposite direction as the rotation of the compressor wheel 30 (FIG. 2). Furthermore, in certain compressor conditions, such as but not limited to, an increased or high airflow event, the noise generated by the airflow 29 (FIG. 2) interacting with the compressor wheel 30 may be quite loud. In one non-limiting example, this noise generated by the compressor wheel 30 may be described as tonal blade pass noise, however other types of noise may be generated by the compressor wheel 30. In response to this increased blade pass noise, some embodiments may configure the support fins 44 with the airfoil profile 88 and position the support fins 44 with the airfoil profile 88 within the recirculation cavity 54 to add pre-swirl (i.e. airflow rotation in opposite direction as compressor wheel rotation) to the recirculation cavity bypass airflow pathway 72. In one non-limiting example, adding pre-swirl to the airflow 29 in the recirculation cavity bypass airflow pathway 72 may change how the recirculation cavity bypass airflow pathway 72 interacts with the compressor wheel 30 such that the airflow 29 in the recirculation cavity bypass airflow pathway 72 may stay in contact with the compressor wheel blades 42 as the compressor wheel 30 rotates. As a result, the blade pass noise generated by the compressor wheel 30 may be reduced by this improved contact between airflow 29 in the recirculation cavity bypass airflow pathway 72 and the compressor wheel blades 42.

INDUSTRIAL APPLICABILITY

Based on the forgoing, it can be seen that the turbocharger 20 incorporating the compressor housing 28 of the present disclosure may find utility in various applications such as, but not limited to, automobiles, trucks, vans, construction equipment and agricultural equipment. Through the novel teachings outlined above, the compressor housing 28 may be fabricated using a shroud ring 40 with support fins 44 that are attached to an inner wall 48 of the compressor housing 28. Additionally, the compressor housing 28 may incorporate an airfoil profile 88 into the support fins 44 and configure the support fins 44 such that they only partially extend through the recirculation cavity 54 in the axial position. As a result, an open space 84 is created within the recirculation cavity that may help reduce the turbulence in the airflow 29. Furthermore, the support fins 44 with the airfoil profile may be shaped to add pre-swirl to the airflow 29 as it interacts with the support fins 44. As a result, the support fins 44 with the airfoil profile 88 may help reduce noise that is generated by the airflow 29 interaction with the compressor wheel 30. Moreover, the use of the airfoil profile 88 may be able to add pre-swirl, or otherwise shape airflow 29 in the recirculation cavity bypass airflow pathway 72 without adding additional turbulence, thereby improving the overall efficiency of the compressor portion 22 of the turbocharger 20.

Figure 7:
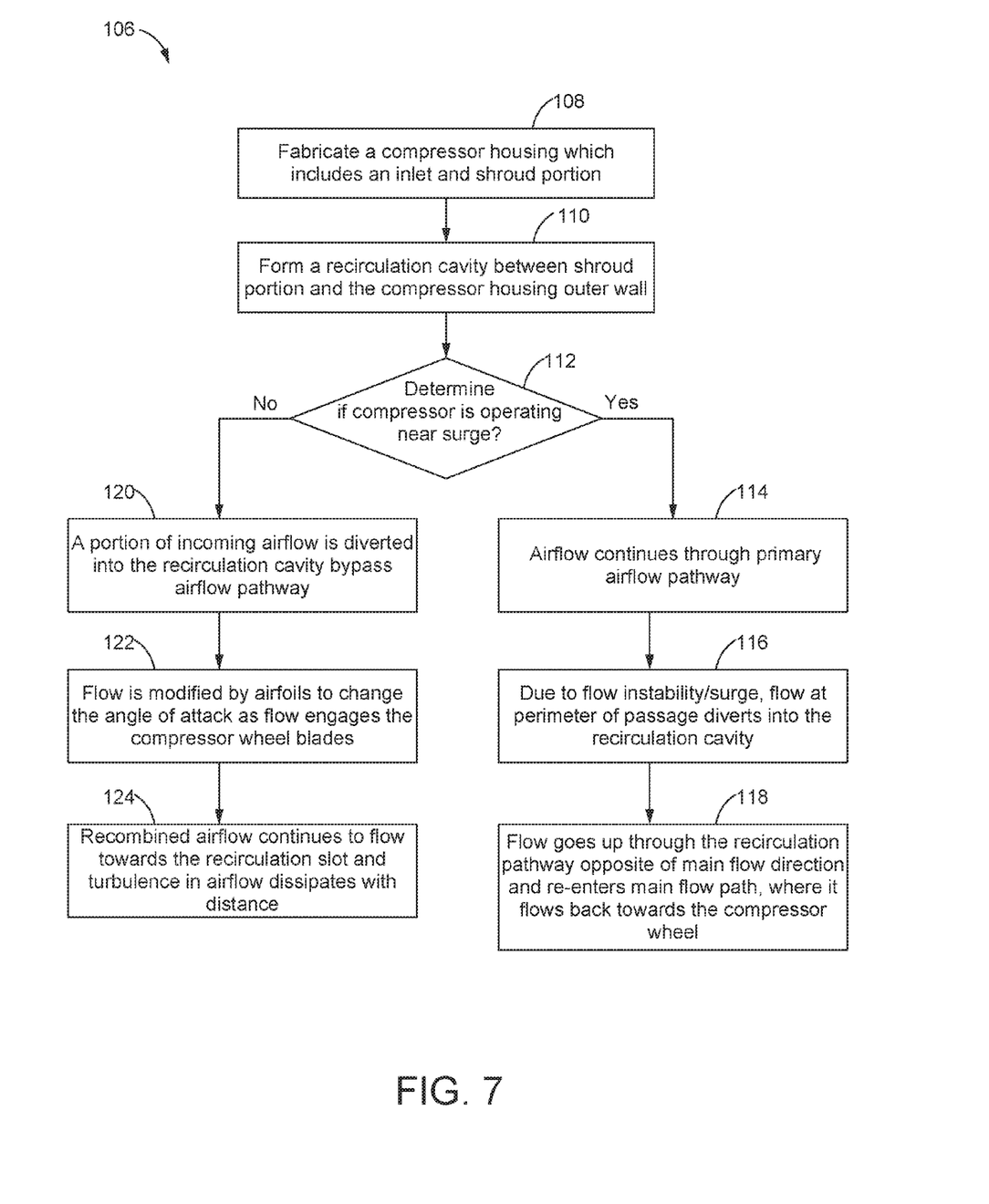
FIG. 7 is a flow chart illustrating an exemplary process or method which may be practiced in accordance with one embodiment of the present disclosure.

FIG. 7 illustrates an exemplary process or method 106 of reducing airflow turbulence and noise as it flows through the compressor portion 22. In a first block 108 of the method 106 a casting process and machining process may be used to fabricate the compressor housing 28, however other fabrication processes may be used. In some embodiments, the compressor housing 28 is formed to include a compressor inlet 38 and a shroud ring 40. Furthermore, the shroud ring 40 may be configured to at least partially surround the compressor wheel 30, which is enclosed within the compressor housing 28.

In another block 110 a recirculation cavity 54 may be formed inside the compressor housing 28. In some embodiments, the recirculation cavity 54 may be positioned between an outer wall 46 of the shroud ring 40 and an inner wall 48 of the compressor housing 28. Moreover, one or more support fins 44 may radially extend between the shroud ring 40 outer wall 46 and outer wall 46 of the compressor housing 28 to provide support for the shroud ring. In a next block 112 a determination of whether the compressor portion 22 is operating at or near the surge point may be made.

In a next block 114, if it is determined that the compressor portion 22 is operating at or near the surge point, then the incoming airflow 29 will continue through the primary airflow path. Furthermore, due to the instability of the incoming airflow 29 when the compressor portion 22 is operating at or near the surge point, in a next block 116 the airflow 29 at the perimeter of the shroud ring 40 may be diverted through the recirculation slot 64 and into the recirculation cavity 54. In a next block 118, some of the airflow 29 may be directed into the recirculation cavity surge airflow pathway 74. In some embodiments, airflow may move through the recirculation cavity surge airflow pathway 74 such that the airflow travels through the recirculation cavity 54 in the opposite direction as the incoming airflow 29, and exits through the recirculation inlet 58 where it rejoins the incoming airflow 29 and flows back towards the compressor wheel 30.

Alternatively, if it is determined the compressor portion 22 is not operating at or near surge, then in a next block 120 a portion of the incoming airflow 29 may be diverted into the recirculation cavity bypass airflow pathway 72. In a next block 122 the airflow 29 diverted into the recirculation cavity bypass airflow pathway 72 may be modified by airfoils 88 to change the angle of attack 102 of the airflow 29 as it engages the compressor wheel blades 42. Moreover, as the airflow 29 moves through the recirculation cavity bypass airflow pathway 72 it may be split and then recombined when it flows past the leading edge 90 and trailing edge 92 of the airfoil profile 88 of the support fins 44.

In a next block 124, the recombined airflow 29 may continue to flow towards the recirculation slot 64 and the compressor wheel 30. Moreover, as the airflow 29 continues to flow towards the recirculation slot 64 the turbulence present in the airflow 29 may dissipate with increasing distance as the airflow 29 continues to move away from the support fins 44. When the airflow 29 reaches the recirculation slot 64 the airflow 29 exits the recirculation cavity 54 and is delivered to the compressor wheel 30.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A compressor housing configured to enclose a compressor wheel, the compressor housing comprising:
   an inlet portion configured to direct an airflow towards the compressor wheel;
   a shroud portion axially spaced from the inlet portion and configured to partially surround the compressor wheel;

a volute portion in fluid communication with the compressor wheel, the volute portion defining an output pathway of the compressor housing;

a recirculation cavity formed between an exterior surface of the shroud portion and an interior surface of the compressor housing, the recirculation cavity in fluid communication with the inlet portion;

a recirculation slot defining an airflow pathway between the recirculation cavity and the compressor wheel;

an angled shroud support extending radially through the recirculation cavity from the exterior surface of the shroud portion to the interior surface of the compressor housing, and the angled shroud support is configured to extend axially through a portion of the recirculation cavity between an upper termination surface and a lower termination surface of the angled shroud support, wherein the lower termination surface terminates the angled shroud support at a position along the shroud portion being no more than three-quarters of a distance measured between a top surface and a bottom surface of the shroud portion; and a flow convergence area defined within the recirculation cavity, wherein the flow convergence area includes an open area that axially extends from the lower termination surface of the angled shroud support to a recirculation cavity inner wall and radially extends from the exterior surface of the shroud portion to the interior surface of the compressor housing, and wherein the open area being unobstructed and circumferentially surrounds the shroud portion between the lower termination surface of the angled shroud support and the recirculation cavity inner wall.

2. The compressor housing of claim 1, wherein the shroud portion and the compressor housing being fabricated from a single piece of material such that the compressor housing and the shroud portion form a unitary component.

3. The compressor housing of claim 1, wherein the angled shroud support is shaped as an airfoil including a leading edge and a trailing edge, and the airfoil being positioned within the recirculation cavity to direct the airflow such that a turbulence of the airflow is minimized.

4. The compressor housing of claim 3, wherein the airfoil is an asymmetric airfoil including an airfoil chord which is aligned along an axis of the compressor housing, the asymmetric airfoil spinning the airflow such that a noise reduction is achieved as the airflow moves from the leading edge to the trailing edge of the asymmetric airfoil.

5. The compressor housing of claim 4, wherein during a high airflow event the asymmetric airfoil shapes the airflow to add a rotation which is in an opposite direction to a direction of a rotation of the compressor wheel such that the noise reduction achieved is a tonal blade pass noise reduction.

6. A turbocharger comprising:
a turbine wheel;
a compressor wheel;
a shaft, rotatably connecting to the turbine wheel and the compressor wheel;
a compressor housing enclosing the compressor wheel;
an inlet portion formed in the compressor housing and configured to direct an airflow towards the compressor wheel;
a shroud portion integrated with the compressor housing and configured to circumferentially surround the compressor wheel;
a volute portion in fluid communication with the compressor wheel, the volute portion defining an output pathway of the turbocharger;

a recirculation cavity formed within the compressor housing and positioned between an exterior surface of the shroud portion and an interior surface of the compressor housing such that the recirculation cavity being in fluid communication with the inlet portion;

a recirculation slot defining an airflow pathway between the recirculation cavity and the compressor wheel;

an angled shroud support extending radially through the recirculation cavity from the exterior surface of the shroud portion to the interior surface of the compressor housing, and the angled shroud support is configured to extend axially through a portion of the recirculation cavity between an upper termination surface and a lower termination surface of the angled shroud support, wherein the lower termination surface terminates the angled shroud support at a position along the shroud portion being no more than three-quarters of a distance measured between a top surface and a bottom surface of the shroud portion; and a flow convergence area defined within the recirculation cavity, wherein the flow convergence area includes an open area that axially extends from the lower termination surface of the angled shroud support to a recirculation cavity inner wall and radially extends from the exterior surface of the shroud portion to the interior surface of the compressor housing, and wherein the open area being unobstructed and circumferentially surrounds the shroud portion between the lower termination surface and the recirculation cavity inner wall.

7. The turbocharger of claim 6, wherein the compressor housing and the shroud portion being fabricated from a single piece of material and having a seamless transition between the inlet portion, the shroud portion, and the volute portion.

8. The turbocharger of claim 6, wherein the angled shroud support is an airfoil including a leading edge and a trailing edge, and the airfoil being positioned within the recirculation cavity to direct the airflow such that a turbulence of the airflow is minimized.

9. The turbocharger of claim 8, wherein the airfoil is an asymmetric airfoil including an airfoil chord which is aligned along an axis of the turbocharger, the asymmetric airfoil spinning the airflow such that a noise reduction is achieved as the airflow moves from the leading edge to the trailing edge of the asymmetric airfoil.

10. The turbocharger of claim 9, wherein during a high airflow event the asymmetric airfoil shapes the airflow to add a rotation which is in an opposite direction to a direction of a rotation of the compressor wheel such that the noise reduction of the turbocharger achieved is a tonal blade pass noise reduction.

11. A method of reducing airflow noise through a compressor, the method comprising:
fabricating a compressor housing including an inlet portion and a shroud portion, the inlet portion configured to direct an airflow through the shroud portion towards a compressor wheel;
forming a recirculation cavity between an exterior surface of the shroud portion and an interior surface of the compressor housing and supporting the shroud portion by radially extending an angled shroud support through the recirculation cavity between the exterior surface of the shroud portion and the interior surface of the compressor housing, wherein the angled shroud support is configured to extend axially through a portion of the recirculation cavity between an upper termination surface and a lower termination surface of the angled shroud support, and the lower termination surface terminates the angled shroud support at a position along the shroud portion being no more than three-quarters of a distance measured between a top surface and a bottom surface of the shroud portion;

defining a flow convergence area within the recirculation cavity, wherein the flow convergence area includes an open area that axially extends from the lower termination surface to a recirculation cavity inner wall, and wherein the flow convergence area circumferentially surrounds the shroud portion between the lower termination surface of the angled shroud support to a recirculation cavity inner wall and radially extends from the exterior surface of the shroud portion to the interior surface of the compressor housing, and wherein the open area being unobstructed and circumferentially surrounds the shroud portion between the lower termination surface of the angled shroud support and the recirculation and the recirculation cavity inner wall;

directing a portion of the airflow from the inlet portion into an airflow pathway which flows through the recirculation cavity, and splitting the portion of the airflow along the angled shroud support as the portion of airflow travels through the airflow pathway; and reducing a turbulence in the portion of the airflow which flows through the recirculation cavity by spacing the angled support shroud an axial distance away from a recirculation slot, such that the portion of airflow split by the angled shroud support recombines within the flow convergence area, flows the axial distance through the flow convergence area towards the recirculation slot and is delivered to the compressor wheel.

12. The method of claim 11, wherein the shroud portion and the compressor housing being fabricated from a single piece of material such that the compressor housing and the shroud portion form a unitary component.

13. The method of claim 11, wherein the angled shroud support is shaped as an airfoil including a leading edge and a trailing edge, and the airfoil being positioned within the recirculation cavity to direct the airflow such that a turbulence of the airflow is minimized.

14. The method of claim 13, wherein the airfoil is an asymmetric airfoil including an airfoil chord which is aligned along an axis of the compressor housing, the asymmetric airfoil spinning the airflow such that a noise reduction is achieved as the airflow moves from the leading edge to the trailing edge of the asymmetric airfoil.

15. The method of claim 14, wherein during a high flow event the asymmetric airfoil shapes the airflow to add a rotation which is in an opposite direction to a direction of a rotation of the compressor wheel such that the noise reduction achieved is a tonal blade pass noise reduction.

* * * * *